(12) United States Patent
Kang et al.

(10) Patent No.: US 8,826,871 B2
(45) Date of Patent: Sep. 9, 2014

(54) METHOD FOR COMBUSTION MODE TRANSITION

(75) Inventors: Jun-Mo Kang, Ann Arbor, MI (US); Jyh-Shin Chen, Troy, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 526 days.

(21) Appl. No.: 13/267,029

(22) Filed: Oct. 6, 2011

(65) Prior Publication Data

US 2013/0087110 A1    Apr. 11, 2013

(51) Int. Cl.
| | | |
|---|---|---|
| F01L 1/34 | (2006.01) | |
| F02D 41/00 | (2006.01) | |
| F02D 13/02 | (2006.01) | |
| F02B 11/00 | (2006.01) | |
| F02D 41/30 | (2006.01) | |

(52) U.S. Cl.
CPC ............... *F02D 13/02* (2013.01); *Y02T 10/128* (2013.01); *F02D 41/0002* (2013.01); *F02D 2041/001* (2013.01); *F02B 11/00* (2013.01); *F02D 13/0207* (2013.01); *F02D 41/3035* (2013.01); *Y02T 10/18* (2013.01); *F02D 41/3064* (2013.01)
USPC ........ 123/90.15; 123/295; 123/305; 123/347; 123/348

(58) Field of Classification Search
CPC .......... F02D 41/3035; F02D 2041/001; F02D 13/0207; F02D 13/0265; F02D 41/3064; F02D 13/0219
USPC ............ 701/101–103, 110; 123/90.11–90.18, 123/90.25–90.27, 295, 305, 347, 348
See application file for complete search history.

(56) References Cited

U.S. PATENT DOCUMENTS

| | | | | |
|---|---|---|---|---|
| 6,655,345 | B2 * | 12/2003 | Ogawa et al. ................. | 123/295 |
| 6,742,494 | B2 * | 6/2004 | Unger et al. .................. | 123/305 |
| 6,769,404 | B2 * | 8/2004 | Aoyama et al. ........... | 123/406.29 |
| 6,827,051 | B2 * | 12/2004 | Kawasaki et al. .......... | 123/90.15 |
| 6,842,691 | B2 * | 1/2005 | Hagner et al. ................ | 701/115 |
| 7,128,051 | B2 * | 10/2006 | Nogi et al. .................... | 123/336 |
| 7,143,753 | B2 * | 12/2006 | Tanaka et al. ............ | 123/568.14 |
| 7,174,880 | B2 * | 2/2007 | Henn et al. .................... | 123/436 |
| 7,275,514 | B2 * | 10/2007 | Kuo et al. ...................... | 123/299 |
| 7,287,497 | B2 * | 10/2007 | Sun et al. ..................... | 123/90.12 |
| 7,308,872 | B2 * | 12/2007 | Sellnau et al. .............. | 123/90.16 |
| 7,314,041 | B2 * | 1/2008 | Ogawa et al. ............ | 123/568.14 |
| 7,360,523 | B2 * | 4/2008 | Sloane et al. ................ | 123/305 |
| 7,444,999 | B2 * | 11/2008 | Kitamura et al. ......... | 123/568.11 |
| 7,540,270 | B2 * | 6/2009 | Kang et al. .................... | 123/295 |
| 7,689,344 | B2 * | 3/2010 | Kang et al. .................... | 701/103 |
| 7,729,844 | B2 * | 6/2010 | Rayl et al. ..................... | 701/103 |
| 7,742,868 | B2 * | 6/2010 | Kang et al. .................... | 701/105 |
| 7,801,665 | B2 * | 9/2010 | Buckland et al. ............. | 701/103 |

(Continued)

*Primary Examiner* — Thomas Moulis
*Assistant Examiner* — Joseph Dallo

(57) ABSTRACT

An internal combustion engine is selectably operable in one of homogeneous charge compression ignition (HCCI) mode with low lift intake and exhaust valve profiles and spark ignition (SI) mode with high lift intake and exhaust valve profiles. Transition from a current combustion mode to a desired combustion mode includes phase adjusting the one of the intake and exhaust valves exhibiting a greater effect upon an effective cylinder volume for a given phase adjustment in the desired combustion mode based upon a desired phasing for the desired combustion mode prior to lift adjusting the one of the intake and exhaust valves and adjusting the other of the intake and exhaust valves.

11 Claims, 3 Drawing Sheets

(56) References Cited

U.S. PATENT DOCUMENTS

| | | | |
|---|---|---|---|
| 7,975,672 B2 | 7/2011 | Kang et al. | |
| 7,987,040 B2 * | 7/2011 | Buckland et al. | 701/103 |
| 8,061,318 B2 * | 11/2011 | Cleary et al. | 123/90.17 |
| 8,091,527 B1 * | 1/2012 | Brown et al. | 123/295 |
| 2005/0183693 A1 * | 8/2005 | Yang et al. | 123/305 |
| 2007/0272202 A1 * | 11/2007 | Kuo et al. | 123/295 |
| 2008/0162020 A1 * | 7/2008 | Itoga et al. | 701/108 |
| 2008/0162021 A1 * | 7/2008 | Itoga et al. | 701/108 |
| 2009/0048757 A1 * | 2/2009 | Chang et al. | 701/102 |
| 2009/0229564 A1 * | 9/2009 | Kang et al. | 123/295 |
| 2009/0240422 A1 * | 9/2009 | Itoga et al. | 701/108 |
| 2009/0272363 A1 * | 11/2009 | Yun et al. | 123/295 |
| 2010/0180876 A1 * | 7/2010 | Leroy et al. | 123/704 |
| 2010/0228466 A1 * | 9/2010 | Ekchian et al. | 701/113 |
| 2010/0242902 A1 * | 9/2010 | Kang et al. | 123/305 |
| 2011/0017157 A1 * | 1/2011 | Itoga | 123/90.15 |
| 2011/0168130 A1 | 7/2011 | Kang et al. | |

\* cited by examiner

US 8,826,871 B2

METHOD FOR COMBUSTION MODE TRANSITION

TECHNICAL FIELD

This disclosure is related to spark-ignited, direct injection (SIDI) internal combustion engines.

BACKGROUND

The statements in this section merely provide background information related to the present disclosure. Accordingly, such statements are not intended to constitute an admission of prior art.

Internal combustion engines utilize valve timing or phasing strategies to effect changes to engine operation and performance. Valve opening and closing timings influence the thermodynamic cycle and the combustion process, including fuel efficiency, emissions, and engine torque level.

A number of advanced combustion strategies are known. One strategy includes late intake valve closing (LIVC) spark ignition. Another includes homogeneous-charge compression ignition (HCCI). HCCI strategies are designed to improve the efficiency and emissions of the internal combustion engine, through a combination of reduced pumping work, an improved combustion process, and improved thermodynamics.

SUMMARY

An internal combustion engine includes selectable intake and exhaust valve lift profiles and phase controllable intake and exhaust valve cams. A current combustion mode is one of homogeneous charge compression ignition (HCCI) with low lift intake and exhaust valve profiles and spark ignition (SI) with high lift intake and exhaust valve profiles. A desired combustion mode is the other of the homogeneous charge compression ignition (HCCI) with low lift intake and exhaust valve profiles and spark ignition (SI) with high lift intake and exhaust valve profiles. A method to transition from the current combustion mode to the desired combustion mode includes phase adjusting the one of the intake and exhaust valves exhibiting a greater effect upon an effective cylinder volume for a given phase adjustment in the desired combustion mode based upon a desired phasing for the desired combustion mode prior to lift adjusting the sensitive valve and adjusting an insensitive valve.

BRIEF DESCRIPTION OF THE DRAWINGS

One or more embodiments will now be described, by way of example, with reference to the accompanying drawings, in which.

DETAILED DESCRIPTION

Figure 1:
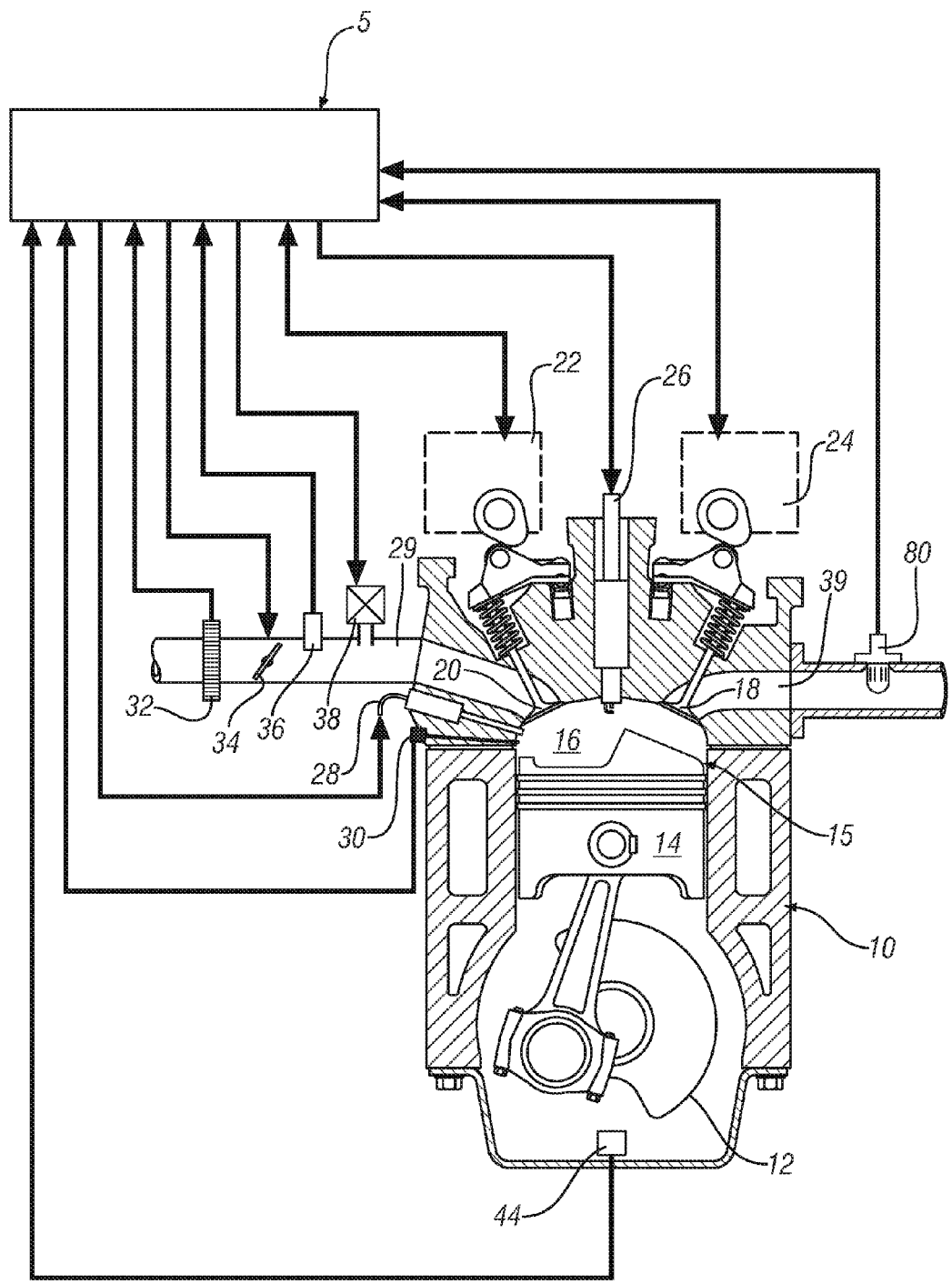
FIG. 1 schematically shows an internal combustion engine and accompanying control module, in accordance with the present disclosure.

Referring now to the drawings, wherein the showings are for the purpose of illustrating certain exemplary embodiments only and not for the purpose of limiting the same, FIG. 1 schematically shows an internal combustion engine 10 and accompanying control module 5. The engine 10 is selectively operative in a controlled auto-ignition combustion mode, a homogeneous spark-ignition combustion mode, and a stratified-charge spark-ignition combustion mode.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system includes airflow ductwork and devices for monitoring and controlling the air flow. The air intake devices preferably include a mass airflow sensor 32 for monitoring mass airflow and intake air temperature. A throttle valve 34 preferably includes an electronically controlled device which controls air flow to the engine 10 in response to a control signal (ETC) from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation (EGR) valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft, the rotations of which are linked and indexed with rotation of the crankshaft 12. The engine 10 is equipped with devices for controlling valve lift of the intake valves and the exhaust valves, referred to as variable lift control (VLC) devices. The variable lift control devices in this embodiment are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (VCP), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5, for example through camshaft rotation position sensors for the intake camshaft and the exhaust camshaft. When the engine 10 is operating in the HCCI combustion mode with an exhaust recompression valve strategy, the VCP/VLC systems 22 and 24 are preferably controlled to the low lift valve openings. When the engine is operating in the homogeneous spark-ignition combustion mode, the VCP/VLC systems 22 and 24 are preferably controlled to the high lift valve openings. When operating in the HCCI combustion mode, low lift valve openings and negative valve overlap may be commanded to generate reformates in the combustion chamber 16. There may be a time lag between a command to change cam phasing and/or valve lift of one of the VCP/VLC systems 22 and 24 and execution of the transition due to physical and mechanical properties of the systems.

The intake and exhaust VCP/VLC systems 22 and 24 have limited ranges of authority over which opening and closing of the intake and exhaust valves 18 and 20 may be controlled. VCP systems may have a range of phasing authority of about 60°-90° of cam shaft rotation, thus permitting the control module 5 to advance or retard valve opening and closing. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Valve overlap of the intake and exhaust valves 20 and 18 refers to a period defining closing of the exhaust valve 18 relative to an opening of the intake valve 20 for a cylinder. The valve overlap may be measured in crank angle degrees, wherein a positive valve overlap (PVO) refers to a period wherein both the exhaust valve 18 and the intake valve 20 are simultaneously open and a negative valve overlap (NVO) refers to a period between closing of the exhaust valve 18 and subsequent opening of the intake valve 20 wherein both the intake valve 20 and the exhaust valve 18 are simultaneously closed. When operating in the HCCI combustion mode, the intake and exhaust valves may have a NVO as part of an exhaust recompression strategy. In a SI-homogeneous combustion mode the intake and exhaust valves may have a NVO, but more typically will have a PVO.

In particular when the intake valve is operating in an high lift setting, wherein the span of crank angle degrees that the valve is open is comparatively large, a timing or phasing of the intake valve closing can be adjusted based upon desired combustion properties. Under normal or nominal conditions, an intake valve opens around top dead center and closes around bottom dead center, maximizing a fresh air or oxygen content in the cylinder. By adjusting the intake valve closing event until after bottom dead center, the properties of the resulting combustion can be manipulated. Retarding intake valve closing may be referred to as late intake valve closing (LIVC). LIVC can be used to increase combustion efficiency in low or part load operation, closing the intake valve after the piston reaches bottom dead center or during the compression stroke, such that the pumping losses for the combustion cycle are reduced due to high cylinder pressure at intake valve closing. Closing the intake valve during the compression stroke permits some of the charge inducted into the cylinder to escape back into the intake manifold such that desired amount of charge for low or part load operation can be achieved.

The engine 10 includes a fuel injection system, including a plurality of high-pressure fuel injectors 28 each adapted to directly inject a mass of fuel into one of the combustion chambers 16, in response to a signal (INJ_PW) from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal (IGN) from the control module 5. The spark plug 26 may enhance the ignition process of the engine at certain conditions such as for the HCCI combustion mode (e.g., during cold engine conditions and near a low load operation limit).

The engine 10 is equipped with various sensing devices for monitoring engine operation, including monitoring crankshaft rotational position, i.e., crank angle and speed. Sensing devices include a crankshaft rotational speed sensor (crank sensor) 44, a combustion sensor 30 adapted to monitor combustion and an exhaust gas sensor 80 adapted to monitor exhaust gases, for example using an air/fuel ratio sensor. The combustion sensor 30 includes a sensor device operative to monitor a state of a combustion parameter and is depicted as a cylinder pressure sensor operative to monitor in-cylinder combustion pressure. The outputs of the combustion sensor 30, the exhaust gas sensor 80 and the crank sensor 44 are monitored by the control module 5 which determines combustion phasing, i.e., timing of combustion pressure relative to the crank angle of the crankshaft 12 for each cylinder 15 for each combustion cycle. The combustion sensor 30 may also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended area of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and lower ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used.

The control module 5 is an element of an overall vehicle control system, preferably including a distributed control module architecture operable to provide coordinated system control. The control module 5 is operable to synthesize pertinent information and inputs from the aforementioned sensing devices, and execute routines to control various actuators to achieve control of fuel economy, emissions, performance, drivability, and protection of hardware, as described hereinbelow.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Operation in SI combustion mode can include operation at high load with the exhaust and intake valves at a high lift setting. Operation in SI mode at low or part load can include operation with LIVC. Operation in SI mode with LIVC permits higher efficiency at low loads than operation in SI mode without LIVC. Operation in HCCI combustion mode can include operation at low load with the exhaust and intake valves at a low lift setting. Operation in SI with LIVC or operation in HCCI can be sensitive to changes in valve timing. Transitions are required between the combustion modes, such that the engine can utilize different combustion modes as the load required of the engine changes. Transitions between operation with the valves in a high lift setting and operation with valves in the low lift setting require a transition in valve lift. Additionally, such transitions can include changes in valve phasing or timing. Adjusting valve lift or phasing can each change the amount of intake charge air drawn from the intake manifold into the cylinder. One parameter that can be used to measure this change in the amount of intake charge air drawn into the cylinder is effective cylinder volume, or the difference in combustion chamber volume measured as the difference in the volume from when the exhaust valve closes to when the intake valve closes or the inducted airflow into the cylinder. Cam actuated valve phasing cannot be transitioned instantly, and a number of combustion cycles may be required while the valves are transitioning between combustion modes. Abrupt or adverse changes in intake charge air in the cylinder during valve transitions can affect combustion properties including engine torque output, emissions, combustion misfires, and other factors affecting drivability.

Figure 2:
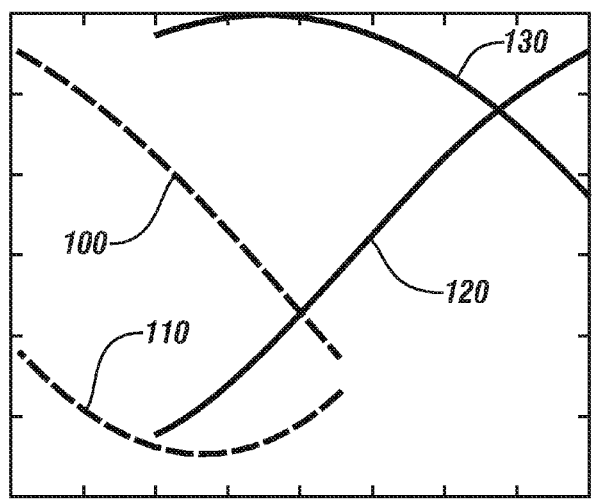
FIG. 2 graphically illustrates effects of changing valve lift and valve phasing upon effective cylinder volume for an exemplary cylinder, in accordance with the present disclosure.

FIG. 2 graphically illustrates effects of changing valve lift and valve phasing upon effective cylinder volume for an exemplary cylinder with late intake valve closing in high lift setting. A horizontal axis illustrates valve phasing. A vertical axis illustrates effective cylinder volume variation. Plot 100 illustrates an exhaust valve operating at low lift. Plot 110 illustrates an exhaust valve operating at high lift. Plot 120 illustrates an intake valve operating at high lift. Plot 130 illustrates an intake valve operating at low lift. Plots 110 and 130 illustrate curved plots existing in relatively low slope regions, indicating that an exhaust valve in a high lift setting and an intake valve in a low lift setting each change the effective cylinder volume little as the phasing of each valve changes. By contrast, plots 100 and 120 illustrate relatively high slope regions, indicating a comparatively large amount of change in effective cylinder volume with a change in phase of either valve. A valve changing effective cylinder volume a large amount for a given amount of phase change in the valve can be termed a sensitive valve. A valve changing effective cylinder volume only a little for a given amount of phase change in the valve can be termed an insensitive valve. Depending upon valve lift, each valve exhibits behavior as one of a sensitive valve and an insensitive valve. FIG. 2 illustrates that, based upon a desired combustion mode and the associated valve lift setting, one of the exhaust and intake valves can be selected as a sensitive valve and the other valve can be selected as an insensitive valve. For example, with a commanded transition from an HCCI combustion mode to an SI combustion mode, wherein the SI combustion mode is the desired combustion mode, the valves will be transitioned to a high lift setting in the desired combustion mode. FIG. 2 illustrates that, in the transition to the high lift setting, the intake valve can be selected as the sensitive valve and the exhaust valve can be selected as the insensitive valve. In another example, with a commanded transition from an SI combustion mode to an HCCI combustion mode, wherein the HCCI combustion mode is the desired combustion mode, the valves will be transitioned to a low lift setting in the desired combustion mode. FIG. 2 illustrates that, in the transition to the low lift setting, the exhaust valve can be selected as the sensitive valve and the intake valve can be selected as the insensitive valve.

A transition between combustion modes includes a desired effective cylinder volume change corresponding to the change in modes. A change from an HCCI combustion mode to an SI combustion mode includes a desired effective cylinder volume change corresponding to intake charge air volume requirements for combustion in SI combustion mode. A desired effective cylinder volume for a combustion mode can be determined, for example, according to a desired engine load, a desired engine speed, and a desired AFR. Alternatively, a desired airflow into the cylinder and a monitored airflow into the cylinder can be compared, and a desired cylinder volume or volume change can be determined based upon the comparison. According to this latter embodiment, it will be appreciated that as changes are made to the insensitive valve, the comparison of the measured and desired airflows into the cylinder will include and can be used to compensate for any effect of the insensitive valve transition upon the effective cylinder volume. Similarly, a change from SI combustion mode to HCCI combustion mode includes a desired effective cylinder volume change corresponding to intake charge air volume requirements for combustion in HCCI combustion mode. The effective cylinder volume in the desired combustion mode can be termed a desired effective cylinder volume. Aside from the desired effective cylinder volume change corresponding to operation in the desired combustion mode, a transition between the modes can be operated to include as little change in the effective cylinder volume as possible. Observation of the effective cylinder volume sensitive and insensitive behavior of the valves exhibited in FIG. 2 can be used to control such a transition, minimizing or eliminating changes in effective cylinder volume through the transition. According to one embodiment, a valve transition sequence can be utilized wherein, first, a phase of the sensitive valve can be changed to a desired phase. Because the sensitive valve is still in the current or original combustion mode, it remains insensitive or does not change the effective cylinder volume by a large amount for a given change in the phase of the valve. A desired phase for the sensitive valve can be selected, for example, by utilizing data regarding the sensitive valve in the desire combustion mode. Referring to FIG. 2, data for the sensitive valve in the desired combustion mode, according to plots 100 or 120, can be used to select a desired phase for the valve based upon matching the desired effective cylinder volume and the effective cylinder volume indicated by the associated plot. This first step in the transition sequence results in a small change in the effective cylinder volume as illustrated in the associated plots 110 and 130. According to one embodiment, this small change can be offset by adjusting the phase of the other valve including a known effect to effective cylinder volume.

Once the first step of the transition sequence is complete, the lift setting of the sensitive valve can be changed, the lift setting of the insensitive valve can be changed, and the phase of the insensitive valve can be changed. The phase of the insensitive valve can be selected according to a number of considerations. The phase of the insensitive valve can be selected to maintain the opening of the exhaust and intake valves symmetrically centered about top dead center in HCCI mode. The phase of the insensitive valve can be selected based upon desired operation with LIVC. According to one embodiment, the phase of the sensitive valve can be adjusted to compensate for changes in effective cylinder volume incurred during the phase and lift changes of the insensitive valve, maintaining the effective cylinder volume changes associated with adjusting the insensitive valve as small as possible. According to one embodiment, the transition sequence can be operated as follows: first, the phase of the sensitive valve is adjusted to the desired phase; second, the lift setting of the sensitive valve is adjusted based upon the desired combustion mode; third, the lift setting of the insensitive valve is adjusted; and fourth, the phase of the insensitive valve is adjusted.

Figure 3:
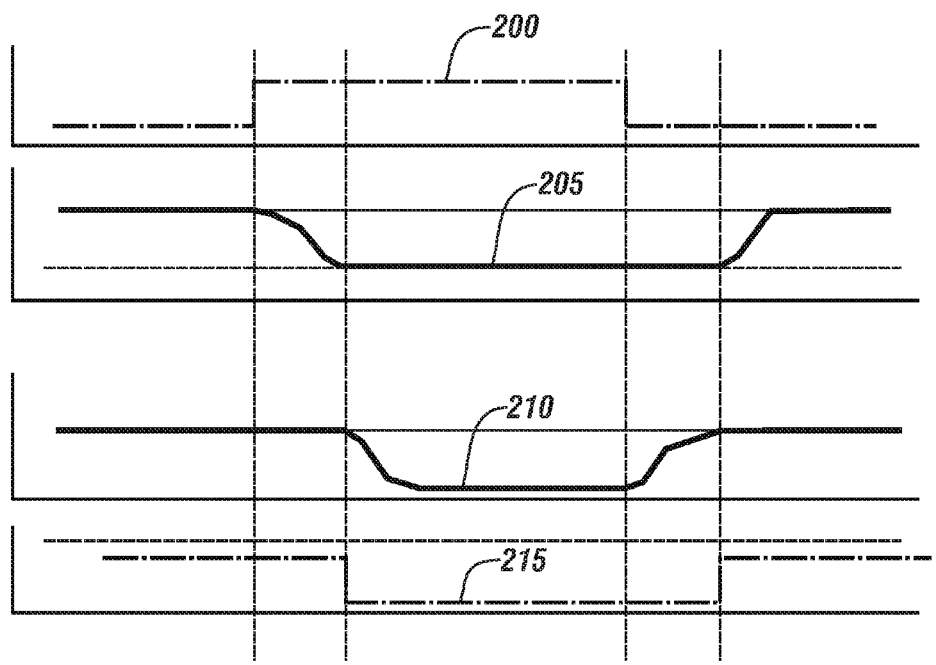
FIG. 3 graphically illustrates operation of an exemplary transition sequence from an HCCI mode to an SI mode and then an exemplary transition sequence from the SI mode back to the HCCI mode, in accordance with the present disclosure.

FIG. 3 graphically illustrates operation of an exemplary transition sequence from an SI mode to an HCCI mode, and then an exemplary transition sequence from the HCCI mode back to the SI mode with constant engine load and speed. Four distinct sections of the figure are illustrated, each illustrating a different value through a common time span. The top-most section of the figure includes a horizontal axis illustrating the common time span for the figure in seconds and a vertical axis illustrating a vertical axis illustrating combustion mode, with the higher value indicating operation in HCCI combustion mode and with the lower value indicating operation in the SI combustion mode. Plot 200 illustrates the engine operating first in the SI mode, changing to the HCCI mode, and then changing back to the SI mode. The section second from the top of the figure includes a horizontal axis illustrating the common time span for the figure in seconds and a vertical axis illustrating desired exhaust valve phasing. The higher value on the vertical axis illustrates a desired exhaust valve phasing for operation in SI combustion mode, and the lower value illustrates a desired exhaust valve phasing for operation in HCCI combustion mode. Plot 205 illustrates desired exhaust valve phasing values through the illustrated time span. The section second from the bottom of the figure includes a horizontal axis illustrating the common time span for the figure in seconds and a vertical axis illustrating desired intake valve phasing. The higher value on the vertical axis illustrates a desired intake valve phasing for operation in SI combustion mode, and the lower value illustrates a desired intake valve phasing for operation in HCCI combustion mode. Plot 210 illustrates desired intake valve phasing values through the illustrated time span. The bottom section of the figure includes a horizontal axis illustrating the common time span for the figure in seconds and a vertical axis illustrating a valve lift command for both the exhaust and intake valves. The higher value on the vertical axis illustrates a high lift setting, and the lower value illustrates a low lift setting. Plot 215 illustrates the lift command through the illustrated time span.

FIG. 3 illustrates a first valve adjusting phasing while the second valve remains substantially fixed with respect to phasing, and then the second valve adjusting phasing while the first valve remains substantially fixed with respect to phasing. However, in one embodiment, the valve illustrated to remain fixed while the other valve adjusts phasing can be slightly adjusted to maintain stability in the parameters affecting combustion, for example, maintaining a fixed effective cylinder volume, as the other valve adjusts phase.

Figure 4:
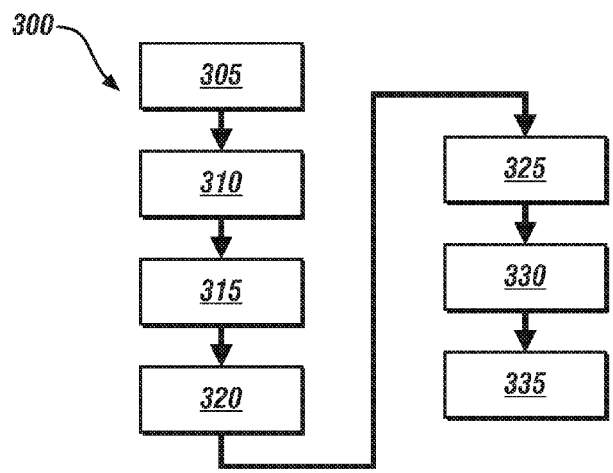
FIG. 4 illustrates an exemplary process to transition between combustion modes, in accordance with the present disclosure.

FIG. 4 illustrates an exemplary process to transition between combustion modes. Table 1 is provided as a key to FIG. 4 wherein the numerically labeled blocks and the corresponding functions are set forth as follows.

TABLE 1

| BLOCK | BLOCK CONTENTS |
| --- | --- |
| 305 | Begin |
| 310 | Monitor a Command to Transition to a Desired Combustion Mode |
| 315 | Determine a Sensitive Valve Based Upon Behavior in the Desired Combustion Mode |
| 320 | Adjust a Phasing of the Sensitive Valve |
| 325 | Adjust a Lift Setting of the Sensitive and Insensitive Valves |
| 330 | Adjust a Phasing of the Insensitive Valve |
| 335 | Operate the Engine in the Desired Combustion Mode |

Process 300 begins at block 305. In block 310, a command to transition to a desired combustion mode is monitored. In block 315, based upon the desired combustion mode, a sensitive valve is determined from an exhaust valve and an intake valve according to disclosed methods. In block 320, phasing of the sensitive valve is adjusted to a desired valve phasing based upon the desired combustion mode. In block 325, a lift setting of each of the effective cylinder volume sensitive and insensitive valves is adjusted. In block 330, an insensitive valve is adjusted for phase based upon operating in the desired combustion mode. In block 335, the engine is operated in the desired combustion mode. Process 300 is one embodiment to transition between combustion modes; however, the disclosure is not intended to be limited to the disclosed exemplary embodiments.

Figure 5:
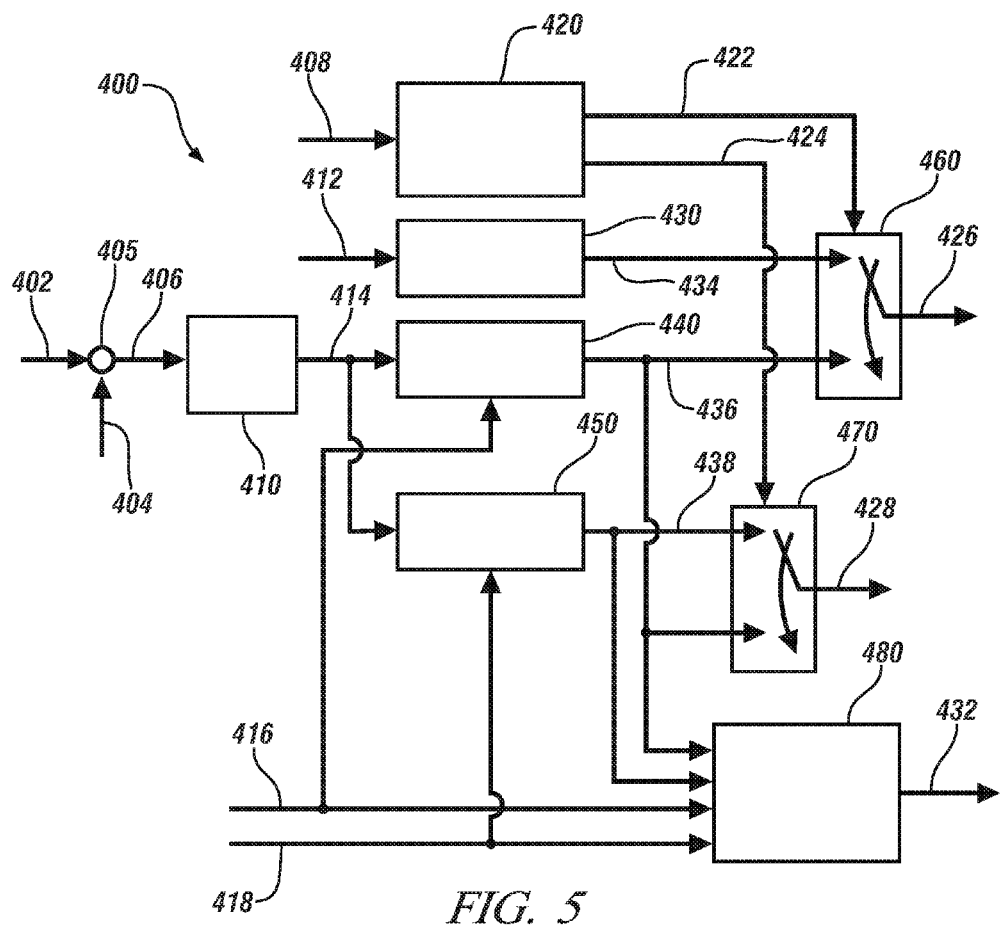
FIG. 5 illustrates an exemplary information flow in a control module utilized to control combustion mode transitions, in accordance with the present disclosure.

FIG. 5 illustrates an exemplary information flow in a control module utilized to control combustion mode transitions. Control module 400 monitors inputs, including desired combustion mode 408, engine speed and load 412, measured airflow 402, desired airflow 404, measured intake valve phasing 416, and measured exhaust valve phasing 418. Summation module 405 monitors measured airflow 402 and desired airflow 404 and determines airflow difference 406. Cylinder volume control module 410 monitors airflow difference 406 and determines a desired cylinder volume 414. Desired valve phasing selection module 420 monitors desired combustion mode 408 and determines exhaust valve phasing selection signal 422 and intake valve phasing selection signal 424, for example, each including a binary selection of whether phasing corresponding to a high lift setting or a low lift setting is desired. High-lift exhaust valve phasing module 430 monitors engine speed and load 412 and determines exhaust valve phasing corresponding to a high lift setting 434. Low-lift exhaust valve phasing module 440 monitors desired cylinder volume 414 and measured intake valve phasing 416 and determines exhaust valve phasing corresponding to a low lift setting 436. High-lift intake valve phasing module 450 monitors desired cylinder volume 414 and measured exhaust valve phasing 418 and determines intake valve phasing corresponding to a high lift setting 438. Selection module 460 monitors exhaust valve phasing selection signal 422, exhaust valve phasing corresponding to a high lift setting 434, and exhaust valve phasing corresponding to a low lift setting 436 and determines desired exhaust valve timing 426. Selection module 470 monitors intake valve phasing selection signal 424, intake valve phasing corresponding to a high lift setting 438, and exhaust valve phasing corresponding to a low lift setting 436 and determines desired intake valve timing 428. Selection module 470 monitoring exhaust valve phasing corresponding to a low lift setting 436 assumes that the intake and exhaust valves have symmetric phasing about top dead center. If different phasing is utilized for low lift operation, then another module would need to be additionally utilized, providing for selection module 470 an intake valve phasing corresponding to a low lift setting. Valve profile switching determination module 480 monitors exhaust valve phasing corresponding to a low lift setting 436, intake valve phasing corresponding to a high lift setting 438, measured intake valve phasing 416, and measured exhaust valve phasing 418 and determines valve profile switching command 432, providing commands to switch valve lift. Control module 400 includes one embodiment of an information flow that can be utilized to control combustion mode transitions. A number of embodiments are envisioned, and the disclosure is not intended to be limited to the particular disclosed exemplary embodiments.

The present disclosure encompasses a valve utilizing two lift positions, a high lift setting and a low lift setting. It will be appreciated that the methods disclosed can be utilized for other configurations to adjust the lift of valves, and the disclosure is not intended to be limited to the particular embodiments disclosed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to transition from a current combustion mode to a desired combustion mode in an internal combustion engine including selectable intake and exhaust valve lift profiles and phase controllable intake and exhaust valve cams, said current combustion mode comprising one of homogeneous charge compression ignition (HCCI) with low lift intake and exhaust valve profiles and spark ignition (SI) with high lift intake and exhaust valve profile and said desired combustion mode comprising the other of homogeneous charge compression ignition (HCCI) with low lift intake and exhaust valve profiles and spark ignition (SI) with high lift intake and exhaust valve profiles, the method comprising:
   phase adjusting a sensitive valve based upon a desired phasing for the desired combustion mode prior to lift adjusting the sensitive valve and adjusting an insensitive valve;
   wherein the sensitive valve comprises the one of the intake and exhaust valves exhibiting a greater effect upon an effective cylinder volume for a given phase adjustment in the desired combustion mode.

2. The method of claim 1, wherein the desired phasing is based upon a desired effective cylinder volume for the desired combustion mode.

3. The method of claim 2, wherein the desired phasing is further based upon compensating for adjusting the insensitive valve.

4. The method of claim 1, wherein lift adjusting the sensitive valve occurs prior to adjusting the insensitive valve.

5. The method of claim 4, wherein adjusting the insensitive valve comprises:
   lift adjusting the insensitive valve; and
   phase adjusting the insensitive valve.

6. The method of claim 1, wherein adjusting the insensitive valve comprises:
   lift adjusting the insensitive valve; and
   phase adjusting the insensitive valve.

7. The method of claim 6, wherein phase adjusting the insensitive valve effects symmetry with the phase adjusted sensitive valve relative to a top dead center position of a piston.

8. The method of claim 1:
   wherein the desired combustion mode comprises homogenous charge compression ignition; and
   wherein the sensitive valve is the exhaust valve.

9. The method of claim 1:
   wherein the desired combustion mode comprises spark ignition; and
   wherein the sensitive valve is the intake valve.

10. Method to transition between a homogeneous charge compression ignition (HCCI) combustion mode with low lift intake and exhaust valve profiles and a spark ignition (SI) combustion mode with high lift intake and exhaust valve profiles in an internal combustion engine including selectable intake and exhaust valve lift profiles and phase controllable intake and exhaust valve cams, the method comprising:
   transitioning from the HCCI combustion mode with intake and exhaust valve low lift profiles to the SI combustion mode with intake and exhaust valve high lift profiles, comprising, in order:
      while both intake and exhaust valves remain in the respective low lift profiles, phase adjusting the intake cam to a predetermined intake valve phase setting which would establish an intake valve closing corresponding to a desired effective cylinder volume if the intake valve were in the respective high lift profile;
      switching the intake and exhaust valves from the respective low lift profiles to the respective high lift profiles; and
      while both intake and exhaust valves remain in the respective high lift profiles, phase adjusting the exhaust cam to a predetermined exhaust valve phase setting corresponding to the SI combustion mode; and
   transitioning from the SI combustion mode with intake and exhaust valve high lift profiles to the HCCI combustion mode with intake and exhaust valve low lift profiles, comprising, in order:
      while both intake and exhaust valves remain in the respective high lift profiles, phase adjusting the exhaust cam to a predetermined exhaust valve phase setting which would establish an exhaust valve closing corresponding to a desired effective cylinder volume if the exhaust valve were in the respective low lift profile;
      switching the intake and exhaust valves from the respective high lift profiles to the respective low lift profiles; and
      while both intake and exhaust valves remain in the respective low lift profiles, phase adjusting the intake cam to a predetermined intake valve phase setting corresponding to the HCCI combustion mode.

11. The method of claim 10 wherein the intake valve closing corresponding to a desired effective cylinder volume if the intake valve were in the respective high lift profile comprises an intake valve closing subsequent to a bottom dead center position of a piston.

* * * * *